United States Patent Office 3,197,527
Patented July 27, 1965

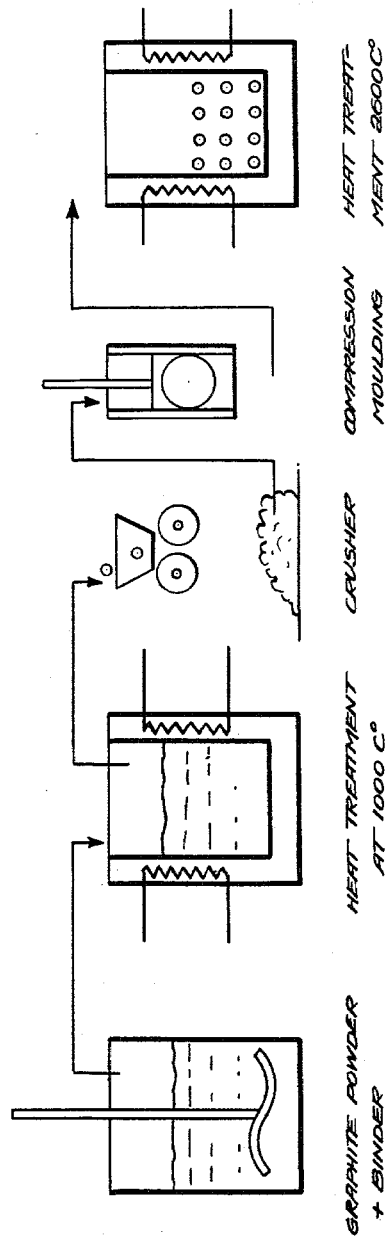

3,197,527
PROCESS FOR THE PRODUCTION OF DENSE SHAPED GRAPHITIC BODIES
Wilhelm Krummeich, Hanau am Main, Germany, assignor to Nuklear-Chemie und -Metallurgie Gesellschaft m.b.H., Wolfgang, near Hanau am Main, Germany
Filed July 20, 1961, Ser. No. 125,358
Claims priority, application Germany, July 21, 1960, N 18,668
3 Claims. (Cl. 264—29)

The present invention relates to an improved process for producing shaped bodies of very low permeability to gases from natural or synthetic graphite in which graphite powder is molded under pressure and such molded bodies are heated.

It is known that the permeability of shaped bodies of graphite as well as compact graphite can be reduced by depositing solid carbon in the pores thereof from the gas phase or by impregnating the graphite with a substance having a high carbon content and subsequently cracking such substance. For similar purposes covering layers or metallic conductive double layers have been applied to surfaces of graphite bodies. All of these processes start from compact graphitized porous graphite bodies which then must be subjected to an aftertreatment often involving a number of separate steps. The effectiveness of the aftertreatment depends to a great degree upon the quality of the graphite and the structure of the graphite body. Such aftertreatment can also lead to the introduction of new impurities in the bodies which have been produced from pure graphite. The introduction of such impurities is especially undesired when the graphite is to be employed for nuclear purposes. Furthermore, the physical and/or chemical properties of the impregnating substance may be so different from those of the graphite that they unfavorably influence the behavior of the graphite. All such previous processes have in common the necessity of subjecting the finished shaped graphite bodies to large numbers of additional manipulations which in some instances can be difficult and costly.

It is also known that shaped graphite bodies of similar properties can be obtained by molding a mixture of powdered graphite with an organic binding agent under pressure to shaped bodies and then subjecting such shaped bodies to a heat treatment, expediently under exclusion of air to effect decomposition of the organic component of the binding agent. The disadvantage of this procedure is that the gases produced by the decomposition upon escaping from the shaped bodies tend to form pores, unless the temperature is so selected that the gas escape proceeds extremely slowly. As a consequence, a relatively low permeability can only be achieved in this manner with a costly and time consuming heat treatment and then satisfactory results can only be achieved when the temperature can be controlled so as to provide for an extremely slow gas escape.

The process according to the invention solves the problem of providing substantially complete impermeability against gases in shaped graphite bodies directly in the production of such shaped bodies. It also renders it possible to avoid with certainty the introduction of additional undesired foreign substances into such bodies. In the process according to the invention a layer of finely divided carbon is produced on the powdered material or synthetic graphite employed as starting material for the production of the shaped graphite bodies before such powders are molded under pressure. For this purpose, according to a preferred embodiment of the invention, a liquid, dissolved or dispersed organic substance of high carbon content is mixed with the graphite powder and such mixture subjected to a heat treatment under exclusion of air, before production of shaped bodies therefrom, so that the organic constituent of the mixture is essentially decomposed to elemental carbon or, in other words, is cracked.

Preferably, such substances are employed as the substances which are to be admixed with the graphite powder and cracked which have as high a carbon content as possible and which are easily thermally decomposed to produce elemental carbon without noteworthy sublimation or evaporation. Preferably, phenol resins, urea resins, polyvinyl acetate, polyester resins and also typical adhesives, such as dextrin, tragacanth or also furane derivatives, such as furfuryl alcohol, are employed for this purpose.

According to the invention the carbon containing organic substance which is either employed in liquid form or in the form of a solution or dispersion is carefully mixed with the graphite powder. The quantity added is such that a free flowing crumbly earth moist mass is produced. This mass is then subjected to a heat treatment whereby the maximum temperatures, in general not over 1000° C., should be selected with reference to the material added so that the decomposition to elemental carbon is effected to as far a reaching degree as possible but at the same time the decomposition is as sparing as possible. The resulting product which is usually more or less caked is then comminuted mechanically, for example, in a crushing mill to agglomerate sizes of <5 mm. and unexpectedly possesses excellent molding properties without addition of further binding agents. The graphitic material, the surfaces of which have thus been coated with carbon, can then be converted to shaped bodies, such as rods, cubes, tubes, spheres and the like, in the usual manner and thereafter baked as usual. In case that the shaped bodies are to be employed for nuclear purposes, it is advisable to subject them to a high temperature aftertreatment under vacuum so that the last gas residues, especially hydrogen are removed, without, however, causing the density of the shaped graphite body to increase noticeably. Regardless of whether the shaped bodies have been subjected to a low or high temperature treatment under vacuum, graphitization, if necessary, can be effected subsequently by known methods, for example, at temperatures over 2000° C.

According to a further advantageous embodiment of the invention it is possible to incorporate finely divided carbon in the form of carbon black to the molding mixture. Such additional carbon also acts as a sealing agent. The carbon black can be admixed with the graphite or also together with the solution or dispersion of the organic substance of high carbon content. For nuclear purposes, carbon black produced by the thermal decomposition of acetylene is especially suited.

It is also possible to deposit the organic substances of high carbon content on the graphite particles from the gas phase and then to process the coated particles as described. For example, treatment for several hours with propane gas at 700–750° C. is suited for this purpose.

An especial advantage of the process according to the invention is that shaped graphite bodies of low permeability even of nuclear purity can be obtained, without cumbersome aftertreatments, simply by pressing and baking of finely divided graphite, which has been pretreated as above, in the usual manner. It was found that the graphite bodies produced according to the invention have a high crushing strength and considerable resistance to abrasion, and that these properties are maintained at high temperatures of, for example, higher than 2000° C.

The accompanying drawing shows a flow sheet of the process according to the invention.

The permeability of the graphite bodies produced according to the invention (measured as diffusion constant) at most is $10^{-6}$ cm.$^2$/sec. Their specific weight is between with it being most preferred that about equal amounts of sulphur and arylhydroxide stabilizer be employed.

The following examples are presented solely for the purpose of further illustrating and disclosing the invention, and are not to be construed as limitations thereon. Hardness values reported in these examples were made with a standard piece of testing equipment known under the trade designation as "Barcol Impressor."

*Example I*

A solution was prepared from 0.075 part of powdered sulphur, 0.075 part of ditertiary butyl p-cresol, 10 parts of diallyl phthalate monomer, 1 part of lauryl acid peroxide and 1 part of tertiary butyl perbenzoate. The resulting solution was then mixed with a polymerizable composition composed of 10 parts of diallyl phthalate monomer and 80 parts of dipropylene glycol maleate and the resulting mixture mixed with 400 grams of ground limestone of minus 200 mesh, U.S. Sieve Series. The resulting product was a premix plastic stabilized polyester molding composition. Small balls, about 1" to 1½" in diameter, of this premix composition, after heating at 120° F. for more than 20 days, had not gelled, as a knife blade could be pushed manually therein and satisfactory moldings were made therefrom. Hardness reading for a cured molding after a 3 minute cure at about 300° F. was 67 on the "Barcol" scale. In comparison, moldings made from freshly prepared like compositions, except that they contained no stabilizer or conventional stabilizers, and using 2 to 3 minute cures at about 300° F. had hardnesses of from 67 to 73 on the "Barcol" scale. These molding tests and hardness values illustrate that the stabilizer combination of the invention exerted little or no detrimental effect on the molding conditions and resulting molded product. All of the preceding "Barcol" hardness values were substantially the same, being within the limits of experimental error.

When a premixed composition was prepared as above, except that the sulphur and the ditertiary butyl p-cresol were omitted, the unstabilized composition gelled after less than 16 hours at 120° F. to such an extent that a knife blade could not be pressed manually therein and no molding could be produced therefrom. Another premix composition, prepared as described above except that the powdered sulphur was omitted, gelled within less than 55 hours at 120° F. to such an extent that a knife blade could not be pushed manually therein and no molding could be produced therefrom. Still another premix composition, prepared as above except that the ditertiary butyl p-cresol was omitted, gelled within about three days at 120° F. to such an extent that a knife blade could not be pushed manually therein and no molding could be produced therefrom.

*Example II*

Premix stabilized polyester molding compositions with the stabilizer combination of Example I were prepared as in Example I, except that the 1 part of tertiary butyl perbenzoate was omitted and there were employed 2 parts of lauryl acid peroxide. Like compositions also were prepared, except that the stabilizer combination consisted of powdered sulphur and ditertiary butyl p-cresol in an amount of 0.15 part of each. These premix compositions were stable for 60 and 90 minutes respectively, at 180° F. and 75 and 135 minutes, respectively, at 170° F. at which times it was possible to push a toothpick through small about 1 inch diameter balls of these compositions.

In contrast, like premix compositions containing 0.075, 0.15 and 0.3 part of powdered sulphur, after 40, 55, and 80 minutes, respectively, at 180° F. and 45, 70, and 120, minutes, respectively, at 170° F. had gelled to such an extent that it was not possible to push a toothpick through small about 1 inch diameter balls thereof. Like premix compositions containing only ditertiary butyl p-cresol in the amounts of 0.075, 0.15, and 0.30 part, after 35, 45, and 50 minutes, respectively, at 180° F. and 40, 60, and 65 minutes, respectively at 170° F. had gelled to such an extent that it was not possible to push a toothpick through small about 1 inch diameter balls thereof.

*Example III*

A premix stabilized polyester composition was prepared as in Example I except that 0.075 part of guaiacol replaced the 0.075 part of tertiary butyl p-cresol. Small portions of this premixed stabilized polyester molding composition in masses of more than ¼" in thickness were stable at 180° F. for over 90 minutes. After the exposure at 180° F. for 90 minutes these masses were found not to contain any hard, preset lumps or stones; a knife blade could be pushed manually therethrough; and satisfactory moldings at normal molding conditions were prepared therefrom. The "Barcol" hardness of moldings having 20 second and 60 second cures at about 300° F. were 71 for each.

In contrast thereto, masses of more than ¼" thickness of like compositions except that the stabilizer combination of the invention was replaced by 0.075 part and 0.15 part respectively of guaiacol, after less than about 45 minutes at 180° F., had gelled to such an extent that a knife blade could not be pushed manually therethrough and moldings could not be made therefrom. Masses of more than ¼" in thickness of like compositions except that 0.075 and 0.15 part of sulphur replaced the stabilizer combination of the invention, after less than 55 minutes at 180° F. had gelled to such an extent that a knife blade could not be pushed manually therethrough and moldings could not be produced therefrom.

It has been found that stability testing of premix stabilized polyester molding compositions at elevated temperatures substantially below normal molding temperatures provides a reasonably satisfactory basis for estimating the stability of the premix compositions at room temperature. Estimates of room temperature stability follow the assumption that the rate of deterioration of such premix catalyzed composition diminishes as the temperature is lowered, usually about one-half for every 10° F. lowering of temperature. In general, the stability of premix catalyzed polyester compositions is about twice as great at normal room temperature (70° F.) as at 80° F. temperature, about 30 or more times as great at normal room temperature as at 120° F., and about 2000 or more times as great at normal room temperature as at about 180° F. Stability testing of apparently identical samples at 70° F., 120° F. and 180° F. has confirmed the apparent validity of this estimation method, as stabilities of various premix catalyzed polyester compositions at room temperatures have averaged about 30 times the stabilities obtained at about 120° F. and about 2000 times the stabilities obtained at about 180° F. for the same premix composition.

*Example IV*

Each of the stabilizer combinations employed in Examples I, II, III, was incorporated in a premix plastic stabilized polyester molding composition, sold commercially under the name Glaskyd 1901. Glaskyd 1901, a glass fiber reinforced polyester resin molding compound, supplied in forms ranging from ½" diameter rope up to 2½" diameter log, contains an organic peroxide catalyst, an unsaturated polyester resin and a monomeric vinyl compound polymerizable with the polyester. When compositions containing these stabilizer compositions of the invention were cured at the molding conditions recommended by the supplier, the physical properties of the cured products were substantially the same as the properties of products of Glaskyd 1901 not so stabilized. Trade literature of the supplier has stated the useful life of Glaskyd 1901 to be from one to two months at those temperatures encountered in molding shops. In contrast the